UNITED STATES PATENT OFFICE.

CHARLES ARTHUR HOYT, OF BUTTE CITY, MONTANA.

PROCESS OF CHLORIDIZING ORES OF PRECIOUS METALS.

SPECIFICATION forming part of Letters Patent No. 467,171, dated January 19, 1892.

Application filed May 28, 1890. Serial No. 353,479. (No specimens.)

*To all whom it may concern:*

Be it known that I, CHARLES ARTHUR HOYT, a citizen of the United States, and a resident of Butte City, in the county of Silver Bow and State of Montana, have invented certain new and useful Improvements in Processes of Chloridizing Ores of Precious Metals, of which the following is a specification.

My invention relates to an improvement in processes of extracting by wet treatment at any degree of temperature the precious and other valuable metals from ores, mattes, or other metallurgical products containing the same by treating the same with sodium or potassium chlorides or other alkaline chlorides and sulphuric acid, or by means of sodium or potassium chloride, or other alkaline chlorides and bisulphate of either soda or potassa, thereby forming a salt of the precious or valuable metals, which is applicable to treatment by any of the ordinary processes of lixiviation.

The process contemplates the extraction and separation in the form of chlorides of all of the precious metals which may exist together in the ore, or in any metallurgical products, without reference to whether the same be a product of chemical treatment or ore in the "raw" state. These chlorides can be subsequently treated by lixiviation or in any other convenient manner.

The process will be found particularly valuable in connection with the treatment of slimy residues and tailings resultant from the mechanical preparation of the ores of the precious metals, many of which are so poor that treatment by smelting or other operations is unwarrantable.

When sulphuric acid is added to solutions of sodium or potassium chlorides, either in combining quantities or slightly in excess thereof and heat is applied to the mixture, a decomposition of the chlorides takes place, by which hydrochloric acid is generated as one of the products. The same result is obtained when solutions of bisulphate of soda or potassa are mixed in the same proportions with sodium or potassium chloride and are heated. If these mixtures be made in the presence of certain minerals—as, for example, the peroxide of manganese—chlorine gas is also liberated. Now I have discovered that when such mixtures are made in the manner and in the proportions indicated in the presence of the precious metals, all of the silver so present will become precipitated in the form of insoluble chloride, which can be retained with the ore, while the chloride of gold and the salts of all the other metals contained therein are soluble and can be washed out and the gold separated from the other metals by any suitable precipitant, whereupon the chloride of silver can be readily separated from the residue and treated by any of the well-known methods of lixiviation with suitable solvents in the same or other vessels, or they can be amalgamated, according as is most convenient.

In practice the process above described is carried out in the following manner: The ore or other material to be treated is placed in a tank, vat, or other suitable receptacle provided with a false bottom or some other similar arrangement which will enable the leaching solutions to pass through the ore and out of the vessel used. The ore, if necessary, is first washed with hot or cold water. Then a hot solution of sodium or potassium chloride, as may be found most convenient, heated to a temperature of about 120° Fahrenheit, is run into the tank as the last of the wash-water recedes, and is added until the ore is fully saturated or covered by it. Then warm diluted sulphuric acid is run into the tank in such quantities that there shall be enough acid to unite with all the sodium or potassium present in the salt, or a slight excess of acid shall be present. In other words, the proportion of acid added to the salt should be in about or slightly in excess of the combining proportion of the elements composing the same. The effect of the addition of the acid will be to liberate the hydrochloric acid and chlorine originally combined with the alkaline metal in the salt, whereupon the chlorine combines with the precious metals to form chlorides. The solution of acid should be made to circulate through the ore by means of a siphon-pump, or other suitable contrivance, while the chlorination is taking place for any suitable length of time. If no wash-water be used in the first place, the dry chlorides of sodium or potassium are mixed directly with the ore before it is put into the tank, and the hot diluted acid is then added to the mixture in the tank, as before.

For the purpose of carrying out the operation a temperature of 100° Fahrenheit is sufficient; but as the solution will cool in the tank during the chlorination it is desirable to heat it to a somewhat higher temperature at the commencement of the operation. The acid should be diluted with at least an equal volume of water, or preferably with two parts of water to one of acid. By mixing strong commercial sulphuric acid with water sufficient heat will be generated in the solution to raise it to the desired temperature at the time it is run into the tank. The quantity of salt required varies with different ores. Generally from five to ten pounds per ton of ore will be sufficient. When the chloridizing is completed, the solution is drawn off into a suitable tank, if the latter contains sufficient gold or silver to make it worth saving, and the chloridized ore is thoroughly washed with hot or cold water until the wash-water ceases to have an acid reaction. If the details of the process be properly carried out, all the precious metals will be precipitated in the form of chlorides, all the chlorides of precious metals will be retained with the ore, and all the soluble salts of the metals will be carried off with the wash-water. If desired, concentrated sulphuric acid can be added after the ore is introduced into the chlorination-tank by covering the surface of the ore with the water to the depth of about ten to twelve inches and then adding the acid to the solution in small quantities. After the ore is thus chloridized and washed it is ready for leaching by hyposulphite of sodium or any of the well-known solvents of silver chloride usually used for this purpose, without reference to the particular method employed, or the ore containing the silver chloride can be treated by amalgamation.

Instead of using sulphuric acid for the purpose of liberating the hydrochloric acid and chlorine in the solution of alkaline salts, a solution of bisulphate of sodium or of bisulphate of potassium in water may be used with similar results and sometimes with greater effect. In this case the salt so used is added in the form of a warm solution and in quantities sufficient to furnish enough sulphuric acid by its decomposition from a bisulphate to a monosulphate to combine with the alkali present in at least the combining proportions of the elements; or, in case the ore is not washed previous to the chloridization, sodium or potassium bisulphate can be mixed directly with the alkaline chloride in a pulverized form with the ore and then sufficient hot water added to the mixture in the tank to fully cover it and keep it covered during the circulation of the solution.

It will be observed that in carrying out the process before described it is essential to introduce the precipitant in such quantities as to prevent the chloride of silver, after precipitation, from being dissolved and to prevent the formation of sulphates or other soluble salts of the precious metals and to retain the same as an insoluble precipitate with the ore until after the soluble salts of the other metals have been washed out.

I am aware that it is old to chloridize with salt and sulphuric acid with an excess of salt for the purpose of dissolving silver chloride with the other salts and subsequently to separate them by precipitation; but all of the various processes which use such reagents proceed upon a different theory and the chemical reactions in them are different and they seek to produce either soluble chlorides of the precious metals or some other soluble salt of the same, such as sulphate of silver or other metals; but I believe it is new to chloridize with common salt and any salt or acid which, when added in their combining proportions, liberates the hydrochloric acid and chlorine of the common salt, which unite to form insoluble chlorides of the precious metals, or with common salt or any salt or acid when added in such proportions as to permit of the formation, retention, and separation of the insoluble chloride of silver with the ore, and permits of the soluble salts being washed out of the residue; and I therefore claim as my invention—

1. The hereinbefore-described process of separating the precious metals from ores, mattes, and slimes, consisting in mixing the latter with a solution of alkaline chlorides, in adding thereto sulphuric acid, bisulphate of potash, or other equivalent reagent for liberating hydrochloric acid, in such proportions that the alkaline chlorides will be decomposed, hydrochloric acid liberated, and insoluble chlorides of silver formed, and in separating and subjecting the latter to further treatment, while the salts of the other metals will be dissolved in the solution and removed therewith.

2. The hereinbefore-described process of separating the precious metals from ores, mattes, and slimes, consisting in mixing the latter with a solution of alkaline chlorides, and in adding thereto sulphuric acid, bisulphate of potash, or other equivalent reagent for liberating hydrochloric acid, in suitable proportions, in the presence of heat, whereby the alkaline chlorides are decomposed, hydrochloric acid liberated, and insoluble chlorides of silver formed, which may be separated and subjected to further treatment, while the salts of the other metals remain dissolved in the solution and may be removed therewith.

In testimony that I claim the foregoing as my invention I have signed my name in presence of two witnesses.

CHARLES ARTHUR HOYT.

Witnesses:
S. C. BLACKISTON,
D. W. TILTON.